Jan. 12, 1960     B. B. HOLMES     2,920,859
BALANCED VALVE MEANS

Filed June 14, 1952     2 Sheets-Sheet 1

INVENTOR.
BRADFORD B. HOLMES
BY

ATTORNEY

Jan. 12, 1960 B. B. HOLMES 2,920,859
BALANCED VALVE MEANS
Filed June 14, 1952 2 Sheets-Sheet 2

INVENTOR.
BRADFORD B. HOLMES
BY
ATTORNEY

United States Patent Office 2,920,859
Patented Jan. 12, 1960

2,920,859

BALANCED VALVE MEANS

Bradford B. Holmes, New York, N.Y., assignor to Bendix Aviation Corporation, Teterboro, N.J., a corporation of Delaware Application June 14, 1952, Serial No. 293,523

6 Claims. (Cl. 251—282)

This invention relates in general to valves and more particularly has to do with an improved balanced valve of the type wherein the movable valve disc has clamped, or secured thereto, a resilient face that is adapted to engage a coacting valve seat formed on the port, or orifice, of the valve.

While valves of the above type have general utility, they have been found to be particularly useful in fluid pressure regulating devices, such as pressure reducers, where they serve to control the flow of the fluid under pressure between the high and low pressure phases of the device.

It has been found, however, that in instances where the movable valve disc is situated in the high pressure phase of the device, the fluid under high pressure leaks between the resilient face and the surface of the valve disc to which it is secured. As a result, this high pressure becomes effective on the rear surface of the resilient face where it distorts or bulges the same inwardly of the valve seat and into the orifice of the valve. Due to this deformation of the resilient face, when the valve disc is moved away from its coacting seat, the resilient face tends to remain in contact with the seat until after an appreciable movement of the valve disc. Moreover, due to this bulging of the face into the orifice, accurate control of the flow of the fluid therethrough is rendered very difficult, if not impossible. Furthermore, there have been instances where the high pressure behind the resilient face has blown it completely off the valve disc thereby resulting in a total failure of the valve.

The foregoing difficulties are further increased when the resilient face of the valve disc is fabricated from a material such as rubber and the device is used to control fluids under pressure having a relatively low temperature. In this instance, the rubber face tends to contract to a greater degree than the material from which the valve disc is fabricated, thereby increasing the leakage of the fluid under high pressure behind the face.

The present invention contemplates and has for one of its objects the provision of a novel and improved balanced valve including a valve disc having a resilient face and which is so constructed and arranged as to be capable of positive operation in controlling the flow of fluids under relatively wide ranges of pressure and temperature.

Another object of the instant invention is to provide a novel and improved balanced valve embodying means to prevent the distortion of the resilient face thereof in the event the fluid under high pressure leaks between the adjacent surfaces of the resilient face and the surface of the valve disc to which it is secured.

To the above ends, the novel balanced valve contemplated herein includes means for venting the rear surface of the resilient face of the valve disc to a low pressure area to thereby prevent any undesirable build-up of high pressure between the rear surface of the resilient face and the adjacent surface of the valve disc to which it is secured.

Another object of the instant invention is to provide a novel balanced valve that is capable of operation in response to relatively light actuation forces. To that end, the movable valve member is so constructed and arranged as to have equal areas on opposed sides thereof that are exposed to the high pressure of the fluid at the upstream side of the orifice and to the low pressure of the fluid at the downstream side thereof. Thus, the various forces produced on the valve member by the pressure of the fluid are cancelled out, or balanced, and have no appreciable effect upon the force required to open and close the valve.

The above and other objects and advantages of the present invention will appear more fully hereinafter from a consideration of the following description, taken in connection with the accompanying drawings wherein two embodiments of the novel balanced valve contemplated herein are shown by example.

In the accompanying drawings wherein like reference characters designate like parts throughout the several views.

Figure 1:
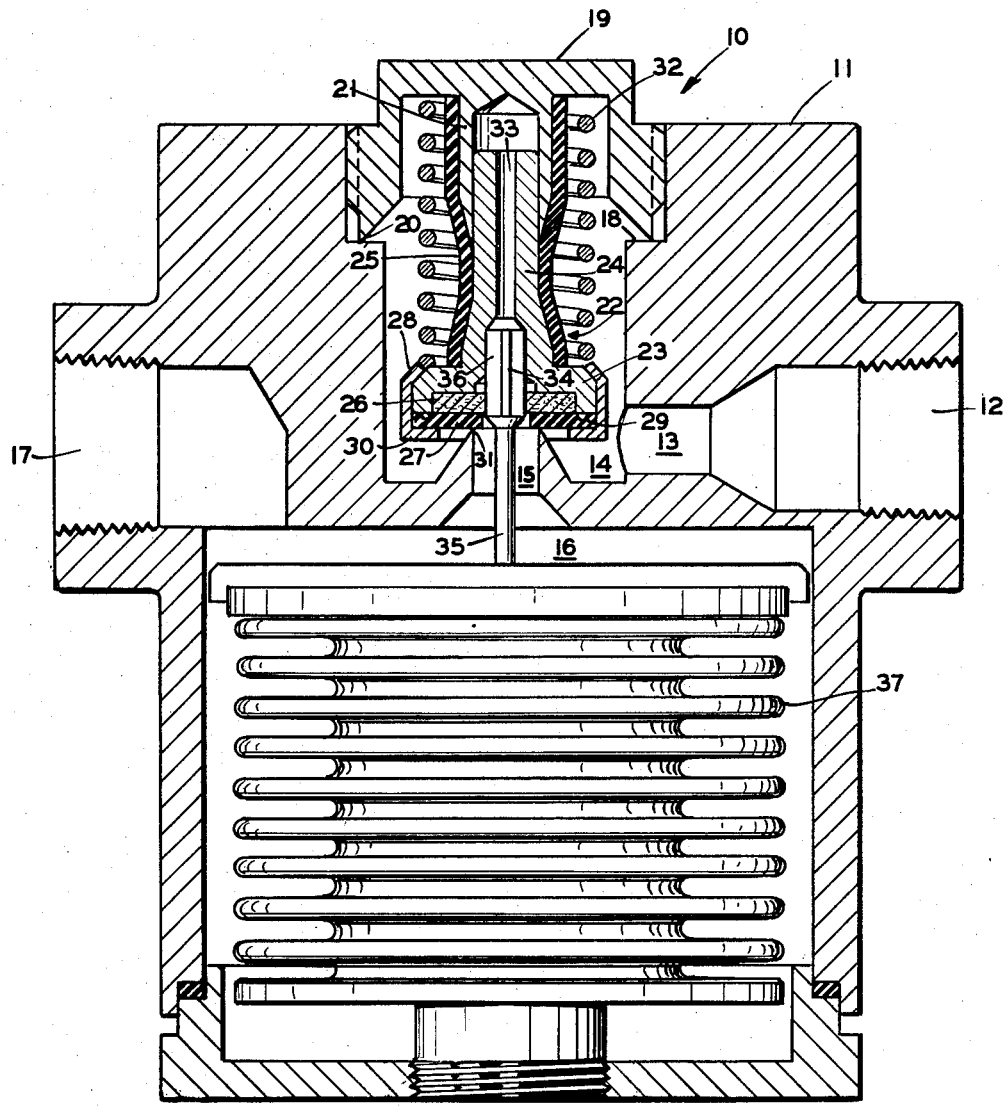
Fig. 1 is a longitudinal section, partially in elevation, through a pressure reducer embodying the novel balanced valve of the instant invention.

Referring now to Fig. 1 of the drawings, the reference character 10 designates a pressure reducer including a casing 11 having an inlet 12 to receive a fluid under high pressure, a passage 13 connecting inlet 12 to a high pressure chamber 14, an orifice 15 communicating high pressure chamber 14 to a low pressure chamber 16 and an outlet 17 from the low pressure chamber 16 for discharging the fluid at a relatively low pressure from casing 11.

High pressure chamber 14 is recessed adjacent the outer end thereof to form a lateral shoulder 18 therein. The wall defining this recess is internally threaded to receive an externally threaded cylindrical plug 19 which serves as an end wall of chamber 14. To prevent leakage between chamber 14 and the exterior of casing 11, the inner extremity of plug 19 is formed into a knife-edge 20 which sealingly engages lateral shoulder 18 when plug 19 is in position. Plug 19 has integrally formed therewith a cylindrical member 21 that is positioned to extend inwardly into chamber 14 where it serves as a means for mounting and guiding a movable valve member 22.

Valve member 22 comprises a substantially flat disc 23 having a stem 24 extending normally from the upper side thereof. The upper portion of stem 24 is constructed to be slidably received within cylindrical member 21 and, for purposes that will hereinafter be explained, the diameter of stem 24 is equal to the diameter of orifice 15. A resilient sleeve 25 fabricated from rubber, or like material, and secured to the exterior surfaces of cylinder 21 and the lower portion of stem 24, serves as a sealing means to prevent the leakage of fluid under high pressure from chamber 14 into the interior of cylinder 21, while permitting the reciprocation of stem 24 therewithin.

The lower side of valve disc 23 is centrally recessed to receive a relatively flat, annular insert 26 formed from porous material, such as sintered bronze. Insert 26 is secured within the recess formed in disc 23 and is so constructed and arranged as to be coextensive with and form a part of the lower surface of disc 23.

To provide a resilient face for valve disc 23, a relatively flat annulus 27 fabricated from a resilient material, such as rubber, is secured to the lower side or surface of disc 23 by suitable fastening means such as a clamp 28. An annular boss or lip 29 formed on the lower side of disc 23 intermediate the peripheries of insert 26 and disc 23, cooperates with a lateral, inwardly extending flange 30 of clamp 28 to securely clamp resilient face 27 therebetween. Due to this construction and arrangement, face 27 is securely clamped to disc 23 with the upper or rear surface thereof abutting the lower surfaces of disc 23 and insert 26.

The resilient face 27 of disc 23 is urged into engagement with an annular substantially knife-edge seat 31 that is formed on orifice 15 and disposed in the high pressure chamber 14, by means of a spring 32 that is positioned between the upper side of disc 23 and plug 19.

As shown in the drawings, the effective cross sectional area of valve seat 31 is equal to the effective cross sectional area of orifice 15. Moreover, the diameter of valve disc 23 is greater than the diameter of seat 31. Therefore, when the former is engaged with the latter, the central portion of the lower surface of disc 23 is exposed to the low pressure of the fluid in orifice 15, i.e., the downstream side of valve seat 31, while the remaining portion thereof is exposed to the high pressure of the fluid in chamber 14. As hereinbefore set forth, the diameter of valve stem 24 is equal to the diameter of orifice 15, and hence valve seat 31. It is manifest, therefore, that the opposed areas of the upper surface of valve disc 23 and the lower surface thereof that are exposed to the high pressure of the fluid in chamber 14 are substantially equal and that the forces produced on these substantially equal areas by the high pressure of the fluid in chamber 14 substantially cancel or balance out.

To provide means for balancing the force produced by the low pressure of the fluid that is effective on the central area of valve disc 23 when it is engaged with valve seat 31, a vertical bore, or passageway 33 is formed in valve member 22. Bore 33, extends through stem 24 and disc 23, from the upper end of the former to the recess formed in the latter in which is mounted insert 26. For purposes that will hereinafter be explained, the lower portion of bore 33 is slightly enlarged. The central openings in annular insert 26 and resilient face 27 are constructed to be of the same size as the lower portion of bore 33, and when the valve member is assembled, the central openings of insert 26 and face 27 register with the lower end of bore 33. Due to this construction and arrangement, when disc 23 is engaged with seat 31 to close the same, the pressure of the fluid at the downstream side of seat 31 is communicated through the central openings in insert 26 and face 27, and bore 33 to the interior of cylinder 21 where it is effective upon the upper end of valve stem 24. Since the diameter of valve stem 24 and valve seat 31 are substantially equal, the areas of the upper end of valve stem 24 and the central portion of the lower surface of valve disc 23 engaged by valve seat 31 are also substantially equal. Therefore, the low pressure of the fluid acting on these substantially equal areas is effectively balanced or cancelled out to the end that the valve member 22 is relatively unaffected thereby.

Thus, by providing substantially equal areas on opposed sides of valve member 22, as above set forth, the forces produced thereon by the pressure of the fluid in the high and low pressure chambers 14 and 16, respectively, acting on these areas, cancel or balance out, to the end that valve disc 23 is maintained in engagement with its coacting seat 31 by the force exerted by spring 32.

Figure 4:
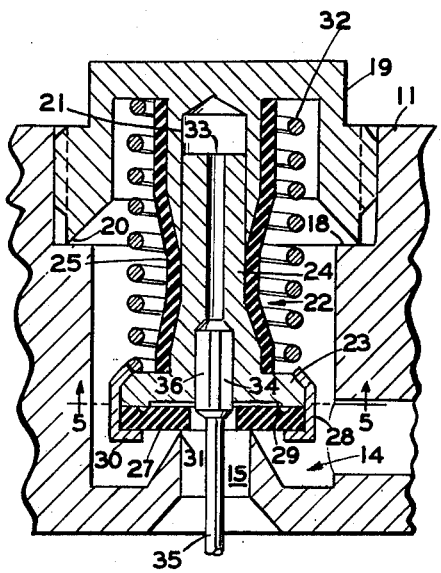
Fig. 4 is a fragmentary view through a second form of the novel balanced valve of the instant invention.
Figure 5:
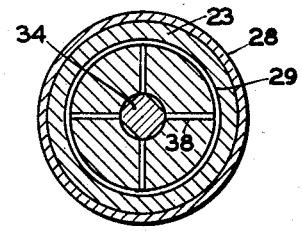
Fig. 5 is a section taken along line 5—5 of Fig. 4.

The enlarged lower portion of bore 33 serves as a socket into which is received the upper end 34 of an actuating stem 35. Member 34 extends through the central openings in insert 26 and face 27, and, as shown more particularly in Figs. 4 and 5, is provided with flat sides 36 to the end that communication between the downstream side of valve seat 31 and the interior of cylinder 21 is maintained. Moreover, due to this construction, the wall defining the central opening of porous insert 26 is exposed to the low pressure of the fluid in bore 33.

Actuating stem 35 extends through orifice 15 where it is secured to a pressure responsive bellows 37 mounted in low pressure chamber 16. Bellows 37 operates in a manner well known in the art to adjust valve member 22 relative to orifice 15, against the bias of spring 32 to control the flow of fluid under pressure from high pressure chamber 14 through orifice 15 into low pressure chamber 16 to the end that the pressure of the fluid in the latter chamber is maintained at a desired preselected value.

Figure 2:
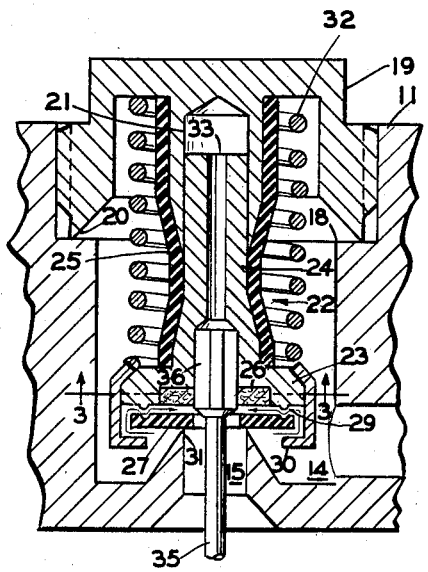
Fig. 2 is a fragmentary section of the instant valve but showing, greatly exaggerated, the path by which the high pressure fluid leaks between the resilient face and the surface of the valve disc to which it is secured.

As shown in Fig. 2, the path by which the fluid under high pressure in chamber 14 leaks behind face 27 has been greatly enlarged and the flow of fluid along this path has been indicated by arrows for the purpose of illustration. As hereinbefore set forth, bore 33 is in communication with low pressure chamber 16 and, therefore, the pressure of the fluid therein is at a relatively low value. Furthermore, the central opening of porous insert 26 is in communication with bore 33. It is manifest, therefore, that when the high pressure fluid leaking along the path indicated by the arrows in Fig. 2 reaches porous insert 26, it will pass through the interstices of the insert into bore 33. Thus, insert 26 serves to vent the high fluid pressure between the rear surface of face 27 and disc 23 into the low pressure fluid within bore 33 to the end that face 27 remains in close contact with disc 23 and is not distorted or bulged by the high pressure fluid.

Figure 3:
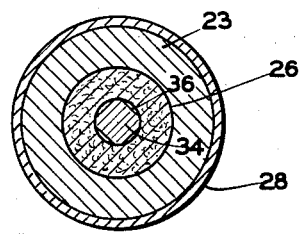
Fig. 3 is a section taken along line 3—3 of Fig. 2.

Reference is now made to Figs. 4 and 5 wherein a second form of the instant invention is shown. In this form, the surface of disc 23 to which resilient face 27 is clamped, is provided with a plurality of shallow grooves 38 which extend radially outwards from bore 33 to the inner edge of annular boss 29. Thus, in the second form of the novel balanced valve contemplated herein, porous insert 26 is replaced by grooves 38 formed in the lower surface of disc 23 which serve to vent the high pressure fluid from behind resilient face 27 into the low pressure fluid in bore 33. In all other respects, the form of the valve shown in Figs. 4 and 5 is identical with the form thereof shown in Figs. 1 to 3, inclusive.

Having thus described the details of construction and arrangement of the various elements of the novel balanced valve contemplated herein, it will be apparent to those skilled in the art that the various objects of the instant invention hereinbefore set forth have been achieved. Although, only two embodiments of the instant novel valve have been described and illustrated, it is understood that various changes and modifications in the form and arrangement of parts will be apparent to those skilled in the art and may be made without departing from the scope of the instant invention. Moreover, it is understood that various other materials may be used in the fabrication of insert 26 and resilient materials other than rubber may be used in the fabrication of face 27.

What is claimed is:

1. The combination with a fluid pressure regulating device including a casing having a first chamber to receive a fluid under pressure and an orifice communicating said first chamber with a second chamber, of valve means for controlling flow through said orifice, said valve means comprising a valve seat surrounding said orifice and disposed in the first chamber, a hollow guide member in the first chamber in axial alignment with said valve seat, a valve member including a valve disc for engagement with said valve seat and a valve stem slidable in said guide member, said valve stem having a cross-sectional area equal to the cross-sectional area of said valve seat, a resilient sleeve embracing said guide member and valve stem to seal the interior of said guide member relative to the first chamber, resilient means biasing said valve disc into engagement with said valve seat, and passageway means communicating the second chamber with the interior of said guide member above said valve stem whereby the pressure of the fluid in the second chamber is effective on the end of said stem in said guide member to produce a force to cancel the force of the pressure in the second chamber effective on said valve disc.

2. The combination with a fluid pressure regulating device including a casing having a first chamber to receive a fluid under pressure and an orifice communicating said first chamber with a second chamber, of valve means for controlling flow through said orifice, said valve means comprising a valve seat surrounding said orifice and disposed in the first chamber, a hollow guide member in the first chamber in axial alignment with said valve seat, a valve member including a valve stem slidable in said guide member, said valve stem having a cross-sectional area equal to the cross-sectional area of said valve seat, and a valve disc, a resilient face secured to a surface of said valve disc for engagement with said valve seat, a resilient sleeve embracing said guide member and valve stem to seal the interior of said guide member relative to the first chamber, resilient means biasing said valve disc to engage the resilient face thereof with said valve seat, passageway means through said valve member communicating the second chamber with the interior of said guide member, and means venting the adjacent surfaces of said resilient face and valve disc to said passageway means.

3. A balanced valve for controlling fluid flow, comprising a casing enclosing a high pressure chamber having an outlet, a valve seat surrounding the outlet, a valve member in the chamber including a valve head engageable with the seat, having an inner portion extending across the outlet and an outer portion extending beyond the seat into said chamber, said valve head including a resilient face member contacting the seat and extending to said passage, arranged for the discharge into said passage and the outlet of high pressure fluid from the high pressure chamber leaking around the face member, the valve member also including a valve stem having an end substantially the same in area as said outlet, a hollow guide member in said chamber slidably fitting the stem and forming a balancing low pressure chamber, and a passage through the stem and head connecting the low pressure chamber with the outlet.

4. A balanced valve for controlling fluid flow, comprising a casing enclosing a high pressure chamber having an outlet, a valve seat surrounding the outlet, a valve member in the chamber including a valve head engageable with the seat, having an inner portion extending across the outlet and an outer portion extending beyond the seat into said chamber, and a valve stem having an end substantially the same in area as said outlet, a hollow guide member in said chamber slidably fitting the stem and forming a balancing low pressure chamber, and a passage through the stem and head connecting the low pressure chamber with the outlet, said valve head including a porous leakage member seated in a recess in the head and extending to said passage, and a resilient face member bearing against said porous member, engaging the seat and extending beyond the seat and porous member into the high pressure chamber, arranged for the discharge into said passage and the outlet through the porous member of fluid leaking from the high pressure chamber around the resilient member.

5. A balanced valve for controlling fluid flow, comprising a casing enclosing a high pressure chamber having an outlet, a source of fluid under high pressure continuously connected to said chamber, a valve seat surrounding the outlet, a valve member in the chamber including a valve head engageable with the seat and a valve stem with an end substantially the same in area as the outlet, a hollow stem guide having a cylindrical portion extending into the chamber and mounted at its top on said casing, slidably fitting the stem, spaced from the head and forming a balancing low pressure chamber connected to the outlet, the valve head including an outer portion extending laterally into the chamber beyond the seat; and a sealing sleeve located within the pressure chamber and having a lower portion laterally spaced from said casing, said sleeve surrounding the cylindrical portion of the stem guide and the valve stem.

6. A balanced valve for controlling fluid flow, comprising a casing enclosing a high pressure chamber having an outlet, a source of fluid under high pressure continuously connected to said chamber, a valve seat surrounding the outlet, a valve member in the chamber including a valve head engageable with the seat and a valve stem with an end substantially the same in area as the outlet, a hollow stem guide having a cylindrical portion extending into the chamber, said guide slidably fitting the stem, spaced from the head and forming a balancing low pressure chamber connected to the outlet, the valve head including an outer portion extending laterally into the chamber beyond the seat, a sealing sleeve fitted around the cylindrical portion of the stem guide and the valve stem, and a coil compression spring located outside of said cylindrical guide portion and the sealing sleeve around the stem within said high pressure chamber and bearing against the outer portion of the valve head.

References Cited in the file of this patent

UNITED STATES PATENTS

| | | |
|---|---|---|
| 174,957 | Hill | Mar. 21, 1876 |
| 347,156 | Bowen | Aug. 10, 1886 |
| 647,706 | Robertshaw | Apr. 17, 1900 |
| 826,714 | Constantinov | Aug. 6, 1907 |
| 1,062,793 | Pendleton | May 27, 1913 |
| 1,125,596 | Robertshaw | Jan. 19, 1915 |
| 1,272,957 | Humphrey et al. | July 16, 1918 |
| 1,396,501 | Brooks | Nov. 8, 1921 |
| 2,076,157 | Westberg | Apr. 13, 1937 |
| 2,254,209 | Buttner et al. | Sept. 2, 1941 |
| 2,403,029 | Smith | July 2, 1946 |
| 2,516,996 | Jensen | Aug. 1, 1950 |
| 2,575,875 | Johnson | Nov. 20, 1951 |

FOREIGN PATENTS

| | | |
|---|---|---|
| 11,477 | Great Britain | of 1886 |
| 468,803 | Italy | Feb. 4, 1952 |